TUNER MECHANISM

Filed July 5, 1963

Inventors
Frank Holper
Jack Lord
By Wallace, Kinzer and Dorn
Attorneys

United States Patent Office 3,248,953
Patented May 3, 1966

3,248,953
TUNER MECHANISM

Frank Holper, Rolling Meadows, and Jack Lord, Des Plaines, Ill., assignors to Molon Motor & Coil Corp., Rolling Meadows, Ill., a corporation of Illinois Filed July 5, 1963, Ser. No. 293,107
3 Claims. (Cl. 74—10.15)

This invention relates to a channel or frequency selecting device and more particularly to a positioning mechanism for a channel selector within said channel selecting device.

Channel or frequency selecting devices, heretofore known and commonly constructed, include a spring biased detent mechanism which holds a frequency selector in a selected position by virtue of a snap action seating of a spring urged ball into a corresponding recess in the selector. These detent mechanisms make an objectionable clicking noise which is commonly experienced for example when moving the selector of a television set from one position to another position. The detent mechanism serves to limit the amount of forward rotation of the channel selector, that is to prevent overtravel, and to prevent rotation in the reverse direction due to backlash in the positioning mechanism.

In order to obtain the desired channel or frequency it is necessary to position the channel selector accurately, and the known prior art selecting devices are constructed of precisely machined elements to minimize the build up of tolerances responsible for overtravel and backlash; and an object of the present invention is to make possible a greater allowance for tolerance in manufacturing of the elemens of a channel selecting device by a unique construction of elements. More specifically, it is an object of the present invention to construct a channel or frequency selecting device for a television receiver or the like in such a manner that it is possible to resort to molded parts of plastic, as distinguished from machined parts, heretofore required in the conventional devices because of the tolerance problems presented by the conventional detent mechanisms.

Another objectionable feature of prior art channel selecting devices is that repeated channel selections are accompanied by appreciable wear with a consequent loss in accuracy in frequency tuning; and another object of the present invention is to compensate for wear within elements of the channel selecting devices by resorting to a construction that represents a drastic departure from the conventional detent mechanism heretofore employed.

In accordance with the preferred embodiment of the invention, the channel selecting device has a rotatable positioning mechanism with a stepping element adapted to step a frequency selector from one frequency position to another, whereupon further rotation of the positioning mechanism causes a final and a fine positioning element to rotate into meshing engagement with a complemental seat in the frequency selector, which seat is accurately associated with a given frequency. The positioning mechanism rotates a positioning surface of a predetermined radius on the fine positioning element into a complemental seating surface of same radius on the selector until the surfaces are concentrically positioned. When the positioning element is positioned so that its surface is concentric with the surface of the seat on the selector, further movement of the positioning element in either forward or reverse direction does not cause movement of the selector.

Other and further objects of the present invention will be apparent from the following description and claims and are illustrated in the accompanying drawings which, by way of illustration show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

Figures 1, 2:
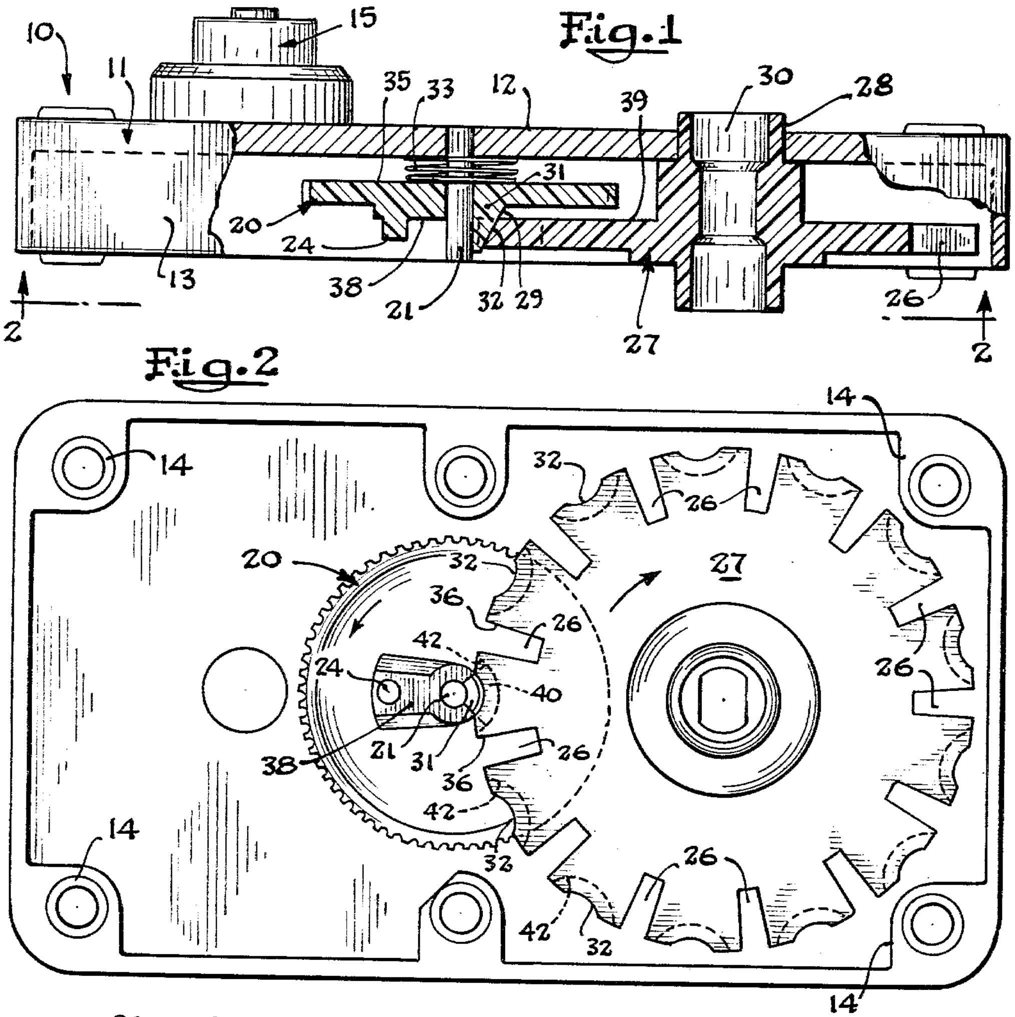
FIG. 1 is a plan view showing a channel selecting device with a portion of a cover broken away and with the positioning mechanism shown in section.
FIG. 2 is an elevational view taken along the line 2—2 in FIG. 1 in the direction of the arrows showing the positioning mechanism of the channel selecting device according to the present invention.

Referring now to the drawings and more particularly to FIG. 1, the channel selecting device 10 is shown with a protective mounting cover or housing 11 having a side wall or plate 12 and top and bottom walls 13, the walls 13 having integrally formed thereon a plurality of apertured bosses 14 by which the channel selecting device 10 can be secured in proper position within a television set or similar receiver and in cooperation with the frequency tuning portion thereof.

Extending outwardly and rearwardly of the plate 12, FIG. 1, is a driving motor 15 which is selectively actuated in response to selective signals to cause the rotation of the channel selector to select different ones of the thirteen channels capable of being selected by the thirteen position selector shown herein. The driving motor 15 operates either a driving pinion or gear train (not shown) which is in mesh with the tooth surface of a rotatable positioning element or driving gear 20. The specific motor 15 and gearing for driving the positioning device are not critical to the present invention and, in fact, a manually operated gear or other drive element could be employed to cause rotation of the positioning device.

The drive gear 20 is freely rotatable on a fixed shaft 21 and is freely slidable in an axial direction on the fixed support shaft 21, which is fixedly mounted to the plate 12. The driving gear 20 is preferably of molded plastic such as nylon or Delrin. The driving gear 20 is biased by a spring 33 outwardly of the plate 12 and the spring 33 encircles the supporting shaft 21 and positioned between the plate 12 and the inner face 35 of the drive gear 20.

The driving gear 20 has integrally formed thereon positioning means in the form of an outwardly projecting boss 38 on which is an integrally formed positioning means in the form of a circular and outwardly projecting stepping element or driving pin 24. The drive pin 24 revolves with the driving gear 20 about the axis of the driving gear 20 and with rotation of the driving gear 20, the driving pin 24 enters a slot 26 on a channel selector 27. The channel selector 27 has, in the present instance, thirteen equally spaced radial slots 26 about its periphery, there being one slot accurately located on the frequency selector for each of the thirteen channel frequencies. The channel selector 27 has a rearwardly positioned boss 28 journalled for rotation in the plate 12 and has an axis which defines a horizontal plane with the axis of the driving gear 20. The boss 28 has a noncircular aperture 30 therein for receiving and for rotating the end of a tuning shaft (not shown).

With each revolution of the rotary positioning means 20 the pin 24 engages a leading side wall 36 of a radial slot 26 to drive the channel selector 27 forward one-thirteenth of a revolution and thereby bring the next succeeding radial slot 26 into proper position, so that upon the next revolution of the stepping pin 24, the stepping pin 24 will move into this last mentioned slot 26 and into engagement with its forward driving wall 36. In this manner, so long as the motor 15 causes a complete revolution of the driving gear 20 and the stepping pin 24, the channel selector 27 moves one increment from one channel position to the succeeding channel position.

It should be pointed out that the selector 27 is likewise a molded plastic element of nylon, Delrin, or the like and cooperates with the plastic driving gear 20 having the stepping pin 24 to turn the selector 27 to approximately the precise channel frequency position upon each revolution without any additional fine tuning. However, to assure a precise positioning of the selector 27 that was assured, in prior art devices, by a detent mechanism employing a spring biased ball for snapping engagement within a recess in a channel selector, the positioning means of the present channel selecting device includes a final and precise positioning element. Specifically, such takes the form of sector-shaped element 31 integrally formed on the driving gear 20 and diametrically opposed from the stepping pin 24. The integrally formed positioning element 31 has a conical surface 29 for seating within a complementary seat 32 formed on the outer periphery of the channel selector 27 and the final positioning element 31 is adapted to be selectively seated in each of the seats 32 along the outer periphery of the selector 27.

As best seen in FIG. 1 the conical surface 29 on the positioning element 31 is longer than a corresponding complemental seat 32 in that the conical surface 29 extends rearwardly of the rear surface 39 of the channel selector 27. The portion of the conical surface 29 extending rearwardly of the rear surface 39 of the channel selector 27 has a cross section of a greater radius than the radius of the cross sections of those portions of the positioning element 31 in engagement with the complementary seats 32 on the channel selector 27. Thus, it should be apparent from FIG. 1 that if the seats 32 become worn and thereby enlarged from repeated interface engagement with the positioning elements 32, that the spring 33 will merely urge the driving gear 20 outwardly to present a larger radius portion of the conical surface 29 into engagement with an enlarged complementary seat 32 whereby the conical surface 29 remains in firmly seated engagement with a seat 32 at all times. It should be appreciated that this is not the case in prior art detent mechanisms wherein spring biased balls become worn and smaller and the complementary seats become larger with wear and hence the exactness of positioning deteriorates with wear in these prior art mechanisms.

The final positioning element 31 functions, when necessary, to complete the final driving of the selector 27 to an exact frequency tuning position whereat the center of the seat 32 is aligned with the plane extending between the axis of the supporting shaft 21 and the rotatable axis of the selector 27. That is, if the driving pin 24 did not move the selector 27 through exactly one-thirteenth of a revolution; but, for example, through slightly less than one-thirteenth of a revolution, the seat 32 will have its center or center line located slightly below the plane extending between the axis of rotation for the supporting shaft 21 and the selector 27 so that the leading portion 42 of the recess 32 is within the rotative path of the leading portion 40 of the final positioning element 31. Thus, the final positioning element 31 engages the leading portion 42 of the recess 32 and moves the selector 27 until the recess 32 is centered on the plane extending between the axes of the supporting shaft 21 and the selector 27.

Figure 4:
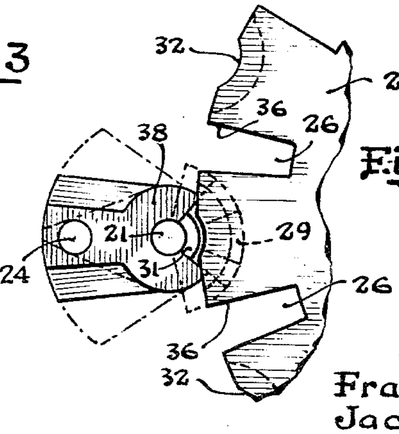
FIG. 4 is a view showing the final positiong element seated within a complementary seat on the selector and showing in dotted line form slight movements of the final positioning element from the solid line position.

When the recess 32 is so positioned, further rotation, that is, overtravel, of the final positioning element 31 from the solid line position in FIG. 4 to the upper dotted line position of FIG. 4 does not cause any movement of the selector 27, since the recess 32 and conical surface 29 on the final positioning element 31 are concentrically arranged with respect to one another so that movement of the conical surface 29 either to the upper dotted line position in FIG. 4 or to the lower dotted line position in FIG. 4 has no effect on the selector 27. Conversely, if after the recess 32 is properly centered and concentrically arranged with respect to the conical surface 29, any reverse rotation of the final positioning element 31 due to backlash in its driving gear train moves the positioning element 31 to the lower dotted line position of FIG. 4 while the selector 27 does not move freely within the recess 32.

Each of the complementary seats or recesses 32 is made so that its surface is concentrically arranged with the conical surface 29 on the driving element 31 when the center line of the recess is in the plane between the axis of the support shaft 21 and the selector 27. Stated somewhat differently the complementary seats 32 and the conical surface 29 are shown in FIG. 1 to be generated by the same line inclined at a predetermined angle to the axis of the support shaft 21 when a recess 32 is in the proper position. At other times, however, it will be realized that the generating axis for the recess 32 is not identically positioned with the generating axis for the conical surface 29 and hence the leading end portion 40 of the final positioning element 31 engages the seat 32 to move the selector 27 until the final positioning element 31 can no longer drive the selector 27 at which time the seat 32 and the conical surface 29 are concentrically arranged one within another. While the surface 29 has been shown as being conically shaped and the seat 32 has been shown as being complementarily formed in a conically shaped recess, it should be realized that the final positioning element 31 could have a circular surface rather than a conical surface and the seat 32 could likewise be circular rather than conically shaped. In both instances, it will be realized that the cross sections of the final positioning element 31 and the seat 32 are in the shape of sectors and that these sector shaped cross sections are so disposed as to have their generating axes coincide when the selector 27 is in its proper position.

To more fully aid in the understanding of the channel selecting device 10, a brief description follows hereinafter.

Figure 3:
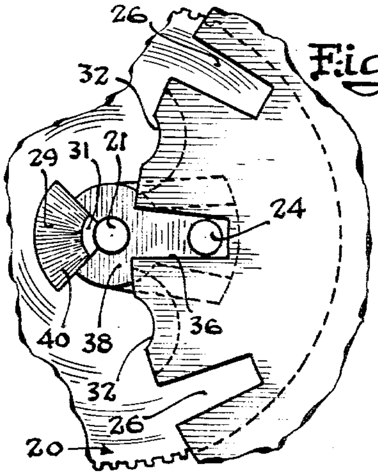
FIG. 3 is an enlarged view showing the driving element in driving engagement with a slot on the channel selector.

With the channel selecting device 10 in the position shown in FIG. 2 a selective operation of the driving motor 13 causes the driving gear 20 to rotate in the counterclockwise direction (FIG. 2) and brings the drive element or stepping pin 24 into one of the radial slots 26 to drive the channel selector 27 in a clockwise direction one increment through the position shown in FIG. 3. Thus, the channel selector 27 has turned to the next frequency position and should be accurately positioned in the precise channel frequency position as the leading counterclockwise portion 40 of the final positioning element 31 moves within the complemental seat 32.

If the selector 27 is not completely driven to its exact frequency position, the leading portion 42 of the complementary seat 32 is in the path of movement of the leading portion 40 of the positioning element 31 and the positioning element 31 effects fine tuning by engaging the leading portion 42 of the seat 32 and rotating the channel selector 27 until the seat 32 is exactly aligned with its generating axis extending through the axis of fixed shaft 21. When the channel selector 27 is in the proper position, shown in full lines in FIG. 4, further overtravel of the final positioning element 31 to the upper dotted line position in FIG. 4 has no effect on the position of the channel selector 27 and conversely any backlash or counterclockwise rotation of the final positioning element 31 to the lower dotted line position in FIG. 4 has no effect on the channel selector 27, which remains in its full line position shown in FIG. 4.

From the foregoing it should be readily apparent that the present channel selecting device is composed of relatively low-cost, plastic, parts of molded construction and yet achieves considerable accuracy of final tuning due to the concentricity and meshing of the final positioning element and complementary seat therefor on the channel selector.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a frequency selecting device for rotating a tuning shaft to a channel frequency and for rotating the tuning shaft to a precise position, (a) a rotatable disc means adapted to be connected to said tuning shaft to cause rotary movement thereof in response to rotation of said disc means, (b) drive means for rotating said disc means to approximately the precise position of a channel frequency, (c) final positioning means operable to move said rotatable disc means and thereby said tuning shaft to a precise final selecting position, said final positioning means having a portion the cross section of which is in the shape of a sector, (d) receiving means on said disc means and carried by said disc means into position to mesh with said sector-shaped cross sectional portion of said final positioning means, said receiving means having a complementary shaped portion of sector-shaped cross section, (e) said portion of said final positioning means and said complementary shaped portion of said receiving means being concentrically disposed relative to one another when said rotatable disc means is in a precise frequency channel selecting position, (f) said disc means having a plurality of slots therein for receiving said moving means, said moving means including a rotatable shaft having a stepping pin selectively engageable with said slots in said rotatable disc means and said final positioning means being carried by said rotatable shaft, and (g) a spring means for urging said sector shaped portion of said final positioning means relative to said seat of said receiving means to maintain them in fully seated engagement.

2. In a channel selecting device for rotating a tuning shaft and for locating the tuning shaft at a precise location, (a) a rotatable disc means having a plurality of slots therein, said disc means adapted to be connected to said tuning shaft to cause a rotary movement thereof in response to rotation of said disc, (b) a frame means rotatably supporting said disc means and said disc means having a predetermined axis of rotation, (c) a shaft means fixedly secured to said frame means, (d) a driving means rotatably mounted on said shaft means for rotation independent of said shaft means and for slideable movement relative to said shaft means, (e) a driving pin means on said driving means selectively movable into the slots on said rotatable disc means to rotate said disc means and thereby said tuning shaft, said driving pin means moving said rotatable disc means approximately to a location, (f) a final positioning means on said driving means and having a portion with a sector shaped, cross section, (g) a plurality of sector shaped, cross section seating means on said rotatable disc means being positioned on said rotatable disc means for meshing engagement with said sector shaped, cross section portion of said final positioning means, said portion of said final positioning means engaging one of said seating means to move said rotatable disc means to a position where the sector shaped portion of said final positioning means and the sector shaped seating means are concentrically arranged one to another whereby further movement of said final positioning means in either direction does not cause a corresponding movement of said rotatable disc means, and (h) a biasing means urging said driving and final positioning means to move axially along said shaft to the seating position within said seating means on said rotatable disc means.

3. In a channel selecting device for rotating a tuning shaft and for locating the tuning shaft at a precise location, (a) a rotatable disc means having a plurality of slots therein, said disc means adapted to be connected to said tuning shaft to cause a rotary movement thereof in response to rotation of said disc, (b) a frame means rotatably supporting said disc means and said disc means having a predetermined axis of rotation, (c) a shaft means fixedly secured to said frame means, (d) a driving means rotatably mounted on said shaft means for rotation independent of said shaft means and for slideable movement relative to said shaft means, (e) a driving pin means on said driving means selectively movable into the slots on said rotatable disc means to rotate said disc means and thereby said tuning shaft, said driving pin means moving said rotatable disc means approximately to a location, (f) a final positioning means on said driving means and having a portion with a sector shaped, cross section, (g) a plurality of sector shaped, cross section seating means on said rotatable disc means being positioned on said rotatable disc means for meshing engagement with said sector shaped, cross section portion of said final positioning means, said portion of said final positioning means engaging one of said seating means to move said rotatable disc means to a position where the sector shaped portion of said final positioning means and the sector shaped seating means are concentrically arranged one to another whereby further movement of said final positioning means in either direction does not cause a corresponding movement of said rotatable disc means, (h) a biasing means urging said driving and final positioning means to move axially along said shaft to the seating position within said seating means on said rotatable disc means, and (i) said portion of said final positioning means being conically shaped and extending axially along said shaft means so that enlargement of a seating means due to wear permits said final positioning means to move axially along said shaft to remain fully seated within said seating means when said seating means has become enlarged due to repeated usage.

References Cited by the Examiner

UNITED STATES PATENTS

| | | | |
|---|---|---|---|
| 1,803,465 | 5/1931 | Dina | 74—436 |
| 2,613,321 | 10/1952 | Howard. | |
| 2,789,441 | 4/1957 | Thorburn | 74—436 |

MILTON KAUFMAN, *Primary Examiner.*